(12) United States Patent
Lee et al.

(10) Patent No.: US 12,517,949 B2
(45) Date of Patent: Jan. 6, 2026

(54) VIDEO INDEXING SYSTEM USING PARALLEL DECODING

(71) Applicant: Twelve Labs, Inc., Seattle, WA (US)

(72) Inventors: Seung Joon Lee, Seoul (KR); Sung Jun Kim, Seoul (KR); Haram Jo, San Francisco, CA (US); Jong Yeop Park, Seoul (KR); Michael Stewart, San Francisco, CA (US); Paul George, San Francisco, CA (US)

(73) Assignee: Twelve Labs, Inc., San Francisco, CA (US)

( * ) Notice: Subject to any disclaimer, the term of this patent is extended or adjusted under 35 U.S.C. 154(b) by 0 days.

(21) Appl. No.: 19/077,670

(22) Filed: Mar. 12, 2025

(65) Prior Publication Data

US 2025/0291843 A1  Sep. 18, 2025

Related U.S. Application Data

(60) Provisional application No. 63/564,448, filed on Mar. 12, 2024.

(51) Int. Cl.
*G06F 16/71* (2019.01)
*G06F 16/735* (2019.01)
(Continued)

(52) U.S. Cl.
CPC ............ *G06F 16/71* (2019.01); *G06F 16/735* (2019.01); *G06V 10/70* (2022.01); *G06V 20/49* (2022.01)

(58) Field of Classification Search
CPC ....... G06F 16/71; G06F 16/735; G06V 10/70; G06V 20/49
(Continued)

(56) References Cited

U.S. PATENT DOCUMENTS 8,385,427 B2 *  2/2013  Bhattacharya ....... H04N 19/172
                                                           375/240.26
8,914,836 B2 * 12/2014  Shivadas .......... H04N 21/23439
                                                           725/110
(Continued)

FOREIGN PATENT DOCUMENTS

CN       107944024 A  *  4/2018  ........... G06F 16/683
CN       109564576 A  *  4/2019  ........... G06F 16/783
(Continued)

OTHER PUBLICATIONS

International Search Report and Written Opinion, PCT Application No. PCT/US2025/019546, May 19, 2025, nine pages.

*Primary Examiner* — Phuong Thao Cao
(74) *Attorney, Agent, or Firm* — Fenwick & West LLP

(57) ABSTRACT

A video analysis system performs indexing of one or more videos in parallel by using pipelines executed by task processors. A task processor may include compute resources configured on a cloud infrastructure or on-premise compute resources. The video analysis system receives requests to index one or more videos. In one instance, the requests may be from users of client devices with requests to index the videos, such that the indexed information can be used to perform downstream applications, such as search query-based retrieval, and the like. The video analysis system performs the indexing process in parallel, so that significant bottlenecks can be eliminated compared to existing methods.

20 Claims, 9 Drawing Sheets

(51) Int. Cl.
*G06V 10/70* (2022.01)
*G06V 20/40* (2022.01)

(58) Field of Classification Search
USPC ........................................................ 707/741
See application file for complete search history.

(56) References Cited

U.S. PATENT DOCUMENTS

| | | | | |
|---|---|---|---|---|
| 9,858,967 | B1* | 1/2018 | Nomula | G10L 15/26 |
| 11,238,093 | B2* | 2/2022 | Ayush | G06F 16/783 |
| 11,302,360 | B1* | 4/2022 | Gupta | G06F 3/0482 |
| 11,995,412 | B1* | 5/2024 | Mishra | G06F 16/735 |
| 12,347,462 | B1* | 7/2025 | Sanghavi | G06V 20/46 |
| 2003/0012279 | A1 | 1/2003 | Chaddha | |
| 2005/0123047 | A1* | 6/2005 | Alvarez Arevalo | H04N 19/66 |
| | | | | 375/240.12 |
| 2010/0067798 | A1* | 3/2010 | Hung | G06T 13/205 |
| | | | | 375/240.26 |
| 2012/0077175 | A1* | 3/2012 | Levisay | G09B 5/06 |
| | | | | 715/721 |
| 2012/0198319 | A1* | 8/2012 | Agnoli | G11B 27/34 |
| | | | | 715/202 |
| 2014/0092973 | A1* | 4/2014 | Wang | H04N 19/40 |
| | | | | 375/E7.104 |
| 2018/0253491 | A1* | 9/2018 | Moraleda | G06F 16/71 |
| 2021/0006781 | A1* | 1/2021 | Rusanovskyy | H04N 19/70 |
| 2022/0086464 | A1* | 3/2022 | Jhu | H04N 19/176 |
| 2022/0382808 | A1 | 12/2022 | Li | |
| 2023/0093746 | A1* | 3/2023 | Guo | G10L 19/008 |
| | | | | 382/157 |
| 2023/0370624 | A1 | 11/2023 | Meardi et al. | |
| 2024/0193207 | A1* | 6/2024 | Seyed Fathi | G06F 16/783 |
| 2024/0292073 | A1* | 8/2024 | Khalil | G06V 20/46 |
| 2024/0362272 | A1* | 10/2024 | Lee | G06F 40/40 |
| 2025/0037409 | A1* | 1/2025 | Lee | G06V 10/82 |
| 2025/0119562 | A1* | 4/2025 | Heckman | H04L 65/765 |

FOREIGN PATENT DOCUMENTS

| | | | | |
|---|---|---|---|---|
| CN | 109565621 | B * | 6/2021 | ....... H04N 21/26603 |
| CN | 114650426 | A * | 6/2022 | ............. H04N 19/85 |
| RU | 2660599 | C1 * | 7/2018 | ............. G06V 40/10 |
| WO | WO-2017139183 | A1 * | 8/2017 | ......... G06F 16/7837 |

* cited by examiner

VIDEO INDEXING SYSTEM USING PARALLEL DECODING

CROSS-REFERENCE TO RELATED APPLICATIONS

This application claims the benefit of U.S. Provisional Patent Application No. 63/564,448, filed on Mar. 12, 2024, which is incorporated herein by reference in its entirety.

BACKGROUND

A video analysis system manages and analyzes a data store of videos. The video analysis system may perform various tasks, including query retrieval, analysis of the videos, and the like. Typically, a user of the video analysis system submits a query that is a request to identify and retrieve videos that are related to the query. For example, a user may submit a query to the video analysis system of "a guy in a red shirt playing tennis in a court" to request videos that include a man in a red shirt playing tennis in a court. The video analysis system performs a relevance analysis and identifies videos that include segments that relate to the query, for example, videos that includes a man in a red shirt playing tennis in a court.

In order to perform such applications, the video analysis system performs an indexing process to map different portions of the video content and create an index of the parsed information so that the index can be used, for example, to identify relevant video segments to a search query. However, current processing pipelines for serially decoded indexing processes are typically computationally inefficient for processing videos, in particular deep learning inference processes, that lead to performance bottlenecks.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
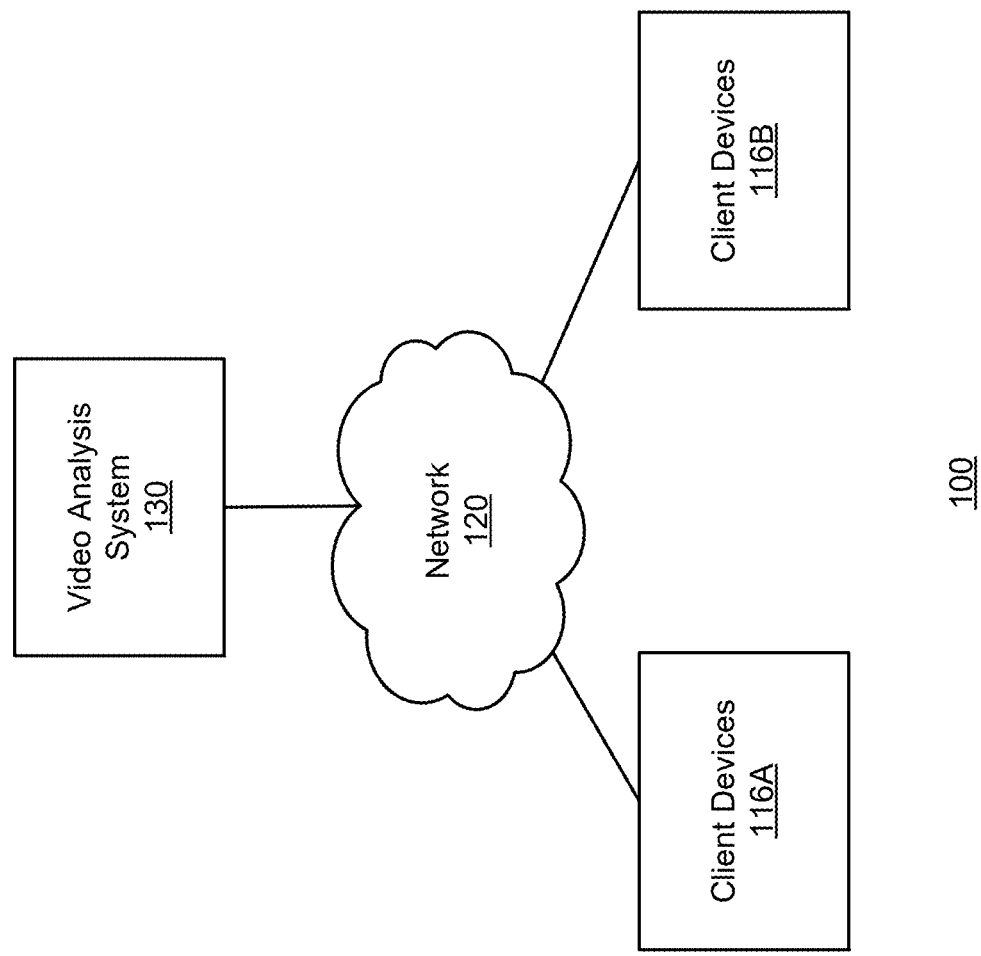
FIG. 1 is a high-level block diagram of a system environment for a video analysis system, in accordance with an embodiment.

FIG. 1 is a high-level block diagram of a system environment for a video analysis system 130, in accordance with an embodiment. The system environment 100 shown by FIG. 1 includes one or more client devices 116, a network 120, and a video analysis system 130. In alternative configurations, different and/or additional components may be included in the system environment 100.

The video analysis system 130 is a system for providing various types of services related to videos to users of client devices 116A, 116B. For example, the video analysis system 130 may manage a collection of videos, where users of the video analysis system 130 can view, retrieve, and share videos managed by the video analysis system 130. The video analysis system 130 may have access to a significant number of videos that when analyzed, provides the video analysis system 130 with insight. For example, the video analysis system 130 may have access to a significant number of reviews by online users that when analyzed, provides the video analysis system 130 with insight into preferences of users.

The video analysis system 130 may receive requests from the client devices 116 to perform various types of tasks on the videos of the video analysis system 130. For example, the video analysis system 130 may perform sentiment classification on video reviews to identify positive or negative reviews for a video. Based on the classification results, the video analysis system 130 may also recommend videos to users associated with positive reviews. As another example, the video analysis system 130 may provide and present statistics on the videos.

In one embodiment, the video analysis system 130 receives one or more search queries from users of client devices 116A, 116B. The request may include a query used by the video analysis system 130 to retrieve videos related to the query. For example, a user may submit a query to the video analysis system 130 to identify one or more videos of "a man in a red shirt playing tennis in a court." The video analysis system 130 performs a relevance analysis to identify videos that are determined to include a man in a red shirt playing tennis in a court. In one instance, the query may include text data, image data, video data, audio data, and the like. The video analysis system 130 may present the identified videos or particular segments of the videos that are relevant to the query.

In one embodiment, the video analysis system 130 performs the relevance analysis by applying one or more machine-learned video retrieval models to the query and the videos managed by the video analysis system 130. Responsive to receiving a user query, the video analysis system 130 obtains one or more video segments from videos. A segment may be a portion or snippet of a video. In one instance, the video retrieval model is configured to receive a pair of the user query and a respective video segment and generate a relevance score for the pair that indicates how relevant the video segment is to the user query. However, it is appreciated that in other embodiments, the video retrieval model may generate relevance scores for multiple video segments simultaneously with one forward pass of the model, and/or the video retrieval model may include one or more models that are each used to generate the prediction score for a respective video segment.

In one embodiment, to perform the video-related tasks, the video analysis system 130 performs a video indexing process to map a plurality of segments of a video to store a standardized representation of each segment in a database. In one example, the standardized format is an embedding or vector representation of the video segment in a latent space.

For example, an embedding representing a segment may be a vector of 1024 dimensions. Using the indexed database, the video analysis system 130 can efficiently and accurately perform various tasks that are requested by users. For example, the embeddings for the video can be used as inputs to a transformer-based architecture to generate textual descriptions of the respective segments of the video, which can then be used to respond to user queries.

Figure 2:
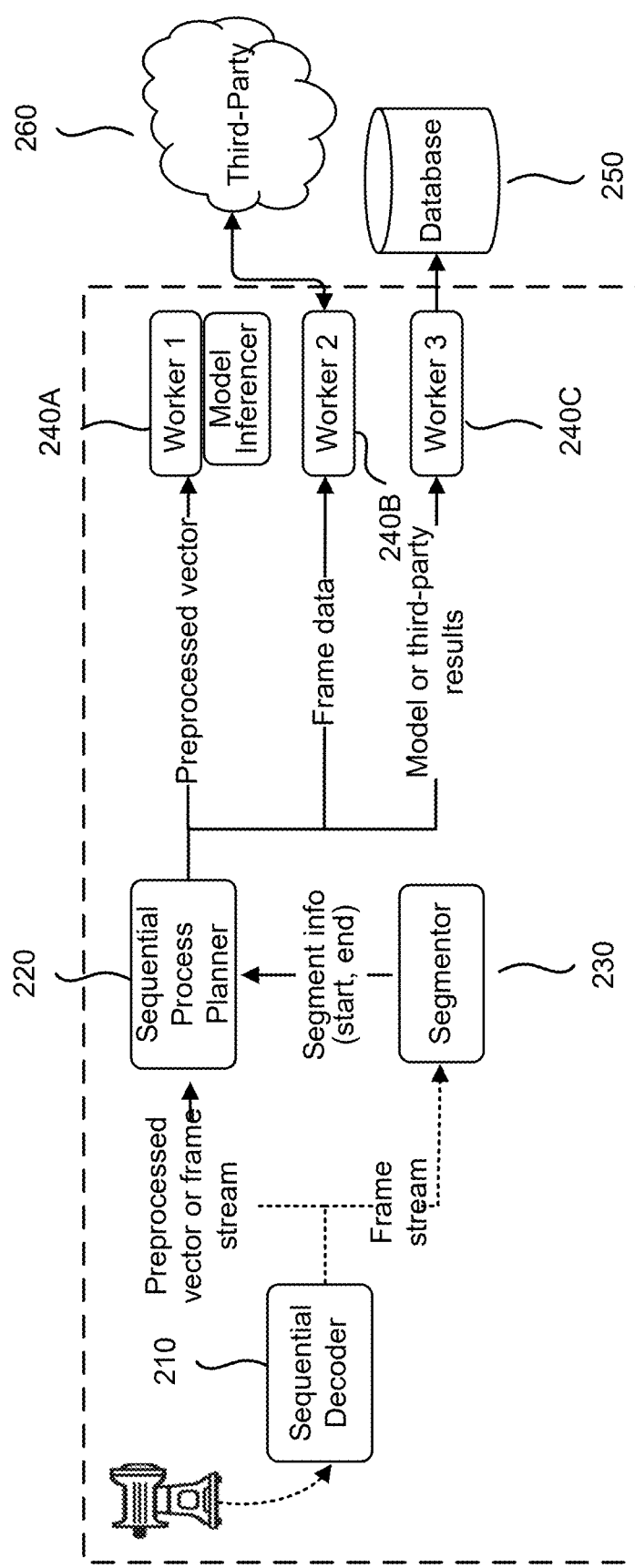
FIG. 2 illustrates an architecture of an indexing process for the video analysis system, in accordance with an embodiment.

FIG. 2 illustrates an indexing process for the video analysis system 130, in accordance with an embodiment. In one embodiment, an example architecture shown in FIG. 2 includes a sequential decoder 210, a sequential process planner 220, a segmentor 230, one or more workers 240A, 240B, 240C, an indexing database 250, and one or more third-party systems 260.

The video analysis system 130 receives and/or obtains one or more videos from a user for indexing. In one embodiment, the sequential decoder 210 sequentially decodes the video from the beginning (e.g., 0 second) of the video. The decoded video stream is provided to the sequential process planner 220 and the segmentor 230 via a data pipeline. The decoded video stream may include a sequence of frames of the video, where each frame is encoded as an image or tensor. In one example, the data for the decoded stream is stored in an in-memory key-value database (e.g., Redis cache) of the sequential process planner 220 or the segmentor 230.

The segmentor 230 applies one or more fixed rules or machine-learned models to generate segmentation information identifying the plurality of segments of the video. The segmentor 230 generates the segmentation information to the sequential process planner 230. In one instance, the segmentor 230 obtains a shot boundary detection model or a scene detection model to identify different segments of the video that are points in the video where a shot transition occurs. For example, a shot transition may occur when there is a scene change, when the camera stops rolling or filming, and the like. The segmentor 230 applies the shot boundary detection model to identify a plurality of video segments that may differ with one another with respect to the content or scene in the frame. In another instance, the segmentor 230 may identify the plurality of video segments, where each segment is a predetermined interval (e.g., 4-second segment) of the video regardless of whether there is a scene change.

The sequential process planner 220 sequentially receives the plurality of video segments from the segmentor 230 and generates requests for the indexing process in conjunction with one or more data processing pipelines. The requests are for execution by the workers 240. The sequential process planner 220 continuously receives responses from workers on whether a job has been completed and schedules the next request in the queue as the responses for previous tasks are received. This process is repeated until the indexing process for the whole video is completed.

The workers 240 receive requests generated by the sequential process planner 220 and may include one or more first workers 240A for model inferencing, one or more second workers 240B for sending requests to third-party systems (e.g., third-party models), one or more third workers 240C for storing and registering indexed data in the database 250, and the like.

In the architecture of FIG. 2, the decoding of the video is sequentially performed, and the indexing process is therefore, also performed sequentially as the video segments are identified by the segmentor 230. Thus, the indexing process may be bound by the sequential decoding process that may result in significant delay. Therefore, in one embodiment, the video analysis system 130 performs parallel decoding and indexing of the video using a novel architecture to perform the process in a significantly more efficient manner.

Architecture and Process for Video Indexing

Figure 3:
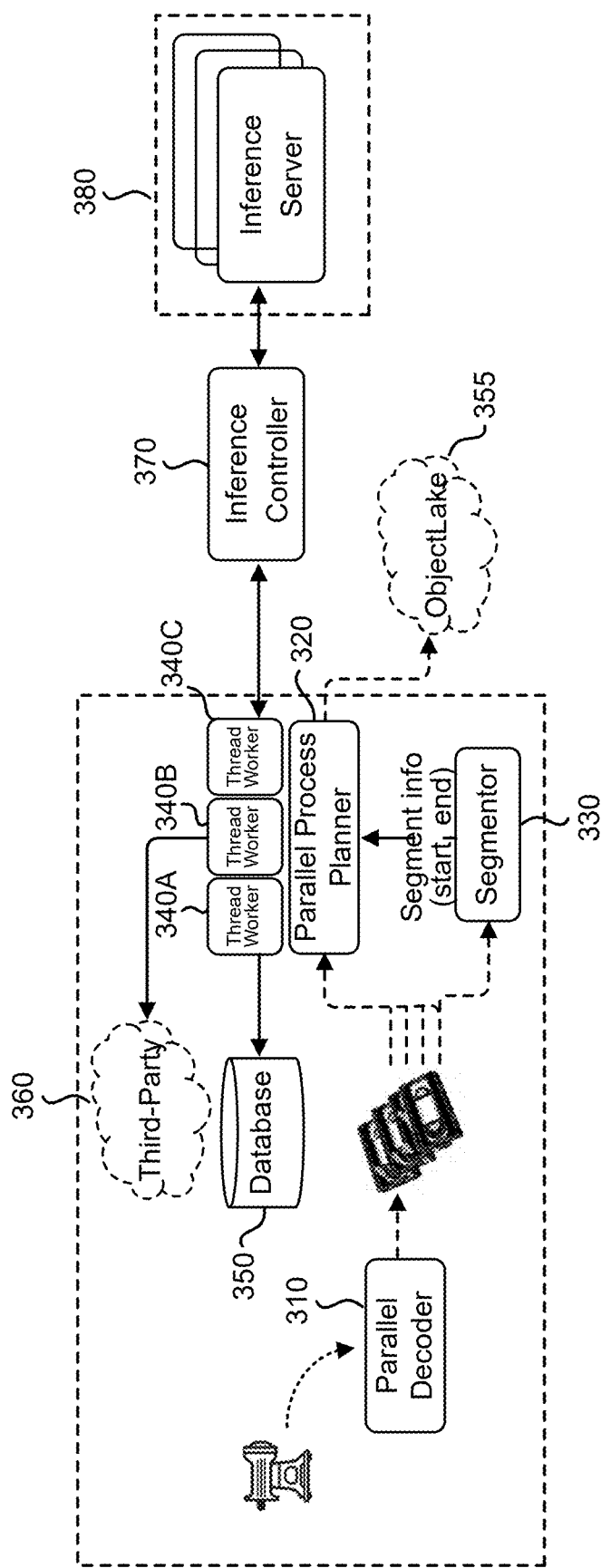
FIG. 3 illustrates an architecture of an indexing process for the video analysis system, in accordance with an embodiment.

FIG. 3 illustrates an architecture of an indexing process for the video analysis system 130, in accordance with an embodiment. In one embodiment, the architecture includes a parallel decoder 310, a parallel process planner 320, a segmentor 330, one or more workers 340A, 340B, 340C, an indexing database 350, an object lake 355, one or more third-party systems 360, an inference controller 370, and one or more inference servers 380.

The parallel decoder 310 receives a video and performs parallel decoding of the video. Specifically, an encoded video may have a designated set of "key frames," in the video that are each a frame that can be decoded independently, in which the decoding process of the key frame does not depend on data from previously decoded frames. For example, a key frame may be an I-frame. In contrast, a P-frame or a B-frame is decoded only after one or more previously frames are decoded. Thus, different portions of the video that each begin with a respective key frame can be decoded in parallel, and the decoded key frame can be used to decode other P-frames or B-frames in the portion of the video. While the latency in conventional decoding processes is approximately proportional to a duration of the video, performing the decoding process in parallel allows the latency to be approximately proportional to the time interval between the different key frames in the video.

In one embodiment, the parallel decoder 310 includes one or more processor components. A processor component is associated with a worker 340 or a model. The processor component performs preprocessing of data depending on the task performed by the worker 340 or model. In one instance, the number of processor components correspond to the number of workers 340 or models that are coupled to receive input from the video frames. A preprocessing stream may be a stream of data that has been preprocessed by the preprocessor component.

The segmentor 330 receives decoded frames from the parallel decoder 310 and applies one or more fixed rules or machine-learned models to generate segmentation information identifying the plurality of segments of the video. In one embodiment, an identified video segment is a unit of processing the content of the frames and temporal relationships between the frames of the video together. In one instance, a video segment may include one or more frames extracted from the video that correspond to the time interval for the video segment. In one instance, a video segment may generally represent a state, content, or data of the video for the specific time interval corresponding to the segment. The video segments likely have some discontinuity between different segments with respect to visual content (video content), audio content, textual content, and the like.

The object lake 355 is a data store (e.g., cloud object store) that stores the decoded frames from the video or various outputs obtained from the video. Specifically, there may be a significant amount of data generated simultaneously as the video is decoded in parallel, compared to when the decoding is performed sequentially. In conventional systems, random access memory (RAM) would typically have sufficient storage to store the data when the video is sequentially processed. However, as the architecture shown in FIG. 3 decodes different portions of the video in parallel and in certain circumstances, data may have to be aggregated, RAM alone may be insufficient to store the data that gets generated during this process. Therefore, the object lake 355 may be a flexible data store that stores large amounts of data including decoded frames or outputs obtained from these frames. For example, the object lake 355 may store the decoded frames of the video, annotated with each video segment interval.

The parallel process planner 320 receives different portions of video frames decoded by the parallel decoder 310 and plans requests to perform indexing on these portions. In one embodiment, the parallel process planner 320 generates and schedules plans, which are units of tasks. A plan may be a request to one thread worker 340. A plan further includes information necessary for retrieving the inputs to a system or model for the task, for example, location of the input data in the object lake 355, the time interval for an input video segment, and the like. In one embodiment, the parallel process planner 320 additionally performs a freeing process, where data that is not needed for any worker 340 tasks is freed from storage (e.g., database 350 or object lake 355).

The thread workers 340 receives job requests from the parallel process planner 320 and executes the requested tasks. In the example architecture shown in FIG. 2, the workers 240 may also perform computation-heavy tasks such as data processing or model inferencing (e.g., with significant number of parameters), and therefore, the workers 240 may each correspond to a separate process within the computing system. In the architecture shown in FIG. 3, the workers 340 associated with the parallel process planner 320 may each be implemented as individual threads rather than individual processes and may perform relatively lightweight tasks compared to the task executed by the inference servers 380 coordinated by the inference controller.

The inference controller 370 receives job requests originating from the one or more workers 340 and loads the requested jobs to the inference servers 380 for execution. In one embodiment, as described above in conjunction with workers 340, the inference servers 380 execute relatively computation-heavy tasks rather than lightweight tasks executed by the workers 340. In the architecture of FIG. 2, a worker 240 was configured to perform both various data-related tasks as well as inference tasks by applying parameters of a trained machine-learning model to index segments of the video. However, in the architecture of FIG. 3, a worker 340 is primarily responsible for lightweight tasks and computation-heavy tasks such as inference are executed on the one or more inference servers 380 and managed by the inference controller 370 described herein.

The inference controller 370 is technically useful because as mentioned above, parallel decoding of a video can create large amounts of data at a time, and a computing system capable of processing the large amount of data is needed. In such an instance, having separate inference servers 380 allows the video analysis system 130 to efficiently perform complex functionalities, such as batching, load balancing, scaling, and the like. Moreover, since there are now a variety of models and applications, often times, the video analysis system 130 may require additional functionalities such as storing a vector in a cache and re-using the vector later during the inference process, managing context for a chatbot application with a user, and the like. Therefore, the inference task as well as these additional functionalities can effectively be managed by separating out the inference-related tasks to the one or more inference servers 380 with an inference controller 370.

Therefore, different from the architecture of FIG. 2, central processing unit (CPU) or memory-bound tasks related to the decoder 310 and the planner 320 may be performed by the workers 340, and scaled as more CPU or memory resources are needed for such tasks. Meanwhile, the inference controller 370 may instantiate and scale instances of inference server instances for executing inference to match the required throughput, with little or no direct dependency with decoding of the video. The inference controller 370 may controls and manages requests, determines status on different models, and scales GPU nodes as needed and determines which models will be deployed on which node.

Example Data Pipelines Using Parallel Decoding of Videos

In a first data pipeline example, the architecture illustrated in FIG. 3 is used to segment a video using a uniform segmentor (i.e., for the segmentor 330) to identify video segments with predetermined intervals (e.g., 15-second, 30-second, 45-second intervals) and generate plans for executing the data pipeline.

Figure 4:
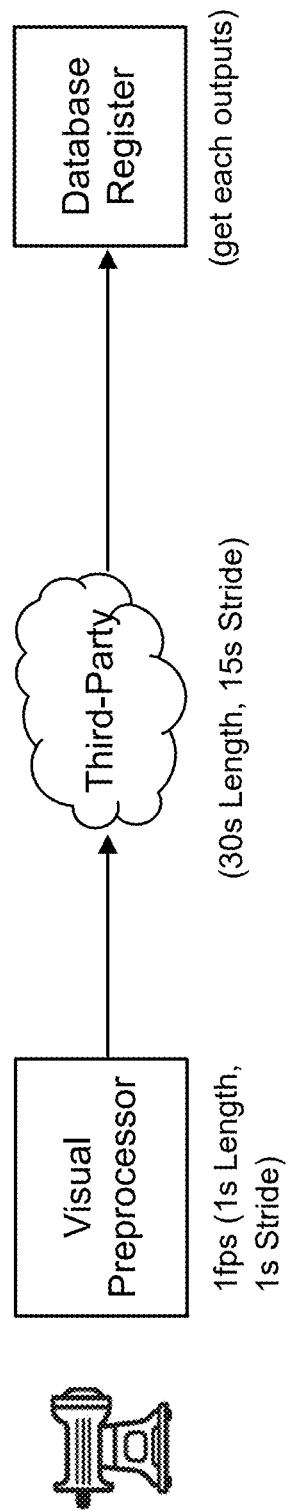
FIG. 4 illustrates a high-level overview of the first example data pipeline, in accordance with an embodiment.

FIG. 4 illustrates a high-level overview of the first example data pipeline, in accordance with an embodiment. In the first data pipeline, there is one type of preprocessing stream with a 1 fps sampling rate. The objective of the first data pipeline is to obtain data for 30-second interval segments, and map each video segment to a respective vector or embedding, with 15-second strides. Moreover, the obtained vectors are registered and stored in the database 350 with the database register.

As an example, a one-minute video may be divided into a set of clips, in which the start of a clip is a respective key frame (e.g., I-frame of the video). An example set is fourteen clips (in the unit of seconds) is (0-3), (3-7), (7-13), (13-16), (16-21), (21-25), (25-28), (28-33), (33-37), (37-41), (41-45), (45-49), (49-52), (52-60). The parallel decoder 310 decodes the fourteen clips in parallel. As the data gets decoded, the processor component processes the decoded frames in a format or schema that a third-party worker thread 340 can use. During this process, a significant number of frames may be decoded from their compressed form. Therefore, in one embodiment, the parallel decoder 310 can appropriately balance between storing the data in disk (object datalake 355) or/and system memory to address memory constraints and I/O costs.

The segmentor 330 as described above determines in this example data pipeline to identify video segments each with 30-second intervals, and 15-second difference between a pair of consecutive segments. Therefore, the segmentor 320 may generate segmentation information specifying intervals for each of the plurality of video segments.

The parallel process planner 320 receives segmentation information and generates one or more plans defined for the data pipeline. For example, the plans may include a first plan ("plan 1") to aggregate decoded data for segment interval 0-30 s and to provide the data to a third-party thread worker 340, a second plan ("plan 2") to aggregate decoded data for the segment interval 15-45 s and to provide the data to a third-party thread worker 340, and a third plan ("plan 3") to aggregate decoded data for segment interval 30-60 s and to provide the data to a third-party thread worker 340.

The plans may also include a fourth plan ("plan 4") to retrieve the results obtained by the third-party worker thread 340 from the first plan and provide the results (that is, vector) to the database register, a fifth plan ("plan 5") to retrieve the results obtained by the third-party worker thread 340 from the second plan and provide the results to the database register, and a sixth plan ("plan 6") to retrieve the results obtained by the third-party worker thread 340 from the third plan and provide the results to the database register.

The parallel process planner 320 may monitor the decoding of the video from the parallel decoder 310, and when the frames for a segment are decoded, the earliest plan possible for the video segment is executed. As an example, when clips (00:13-00:16), (00:16-00:21), (00:21-00:25), (00:25-00:28), (00:28-00:33), (00:33-00:37), (00:37-00:41), (00:41-00:45) have been decoded, the parallel process planner 320 executes plan 2. When clips (00:00-00:03), (00:03-00:07), (00:07-00:13) have been decoded, the parallel process planner 320 executes plan 1. When clips (00:45-00:49), (00:49-00:52), (00:52-00:60) have been decoded, the parallel process planner 320 executes plan 3. Moreover, as plans 1, 2, 3 are completed, the parallel process planner 320 may then execute plans 4, 5, 6 (not necessarily in order). Therefore, because the process proceeds in a parallel manner, the parallel process planner 320 may monitor the status of the decoding process and begin execution of plans for which the decoding process has been completed.

The plans for execution are provided to one or more thread workers 340, and each thread worker 340 may perform an optional preprocessing procedure to transform the data (e.g., frames) that are compatible with a model, module, application, and the like deployed on the third-party system 360, which can be a database system, a model hosting system, and the like. For example, the third-party system 360 may host a large-scale embedding model that maps the input data for a segment (e.g., 30 s×1 fps=30 frames) to a vector. For example, frames for interval 30-33 may be discarded during this process for plan 2.

The thread workers 340 may provide the input data to the third-party system 360 via, for example, an API request, and obtain results as a response. For example, the thread worker 340 executing plan 4 may receive a vector mapping the 30 s interval input data to the latent space. After results from the thread workers 340 are obtained, the parallel process planner 320 may manage the memory to free data does not have to be used for any remaining tasks. For example, after plans 2 and 3 and corresponding plans 5 and 6 have finished executing, the frame data in memory for clips (00:33-00:37), (00:37-00:41), (00:41-00:45) are freed from in-system memory. After, when plan 1 and corresponding plan 4 has finished executing, clips (00:00-00:03), (00:03-00:07), (00:07-00:13), (00:13-00:16), (00:16-00:21), (00:21-00:25), (00:25-00:28) are freed from memory. The process is performed until the plans are completed, and the vectors for each segment are stored in the database.

In a second data pipeline example, the architecture of FIG. 3 is used to segment a video using a segmentor in conjunction with a shot detector model (i.e., for the segmentor 330) to dynamically identify video segments for input to Model A, Model B, and an aggregation model and generate plans for executing the data pipeline.

Figure 5:
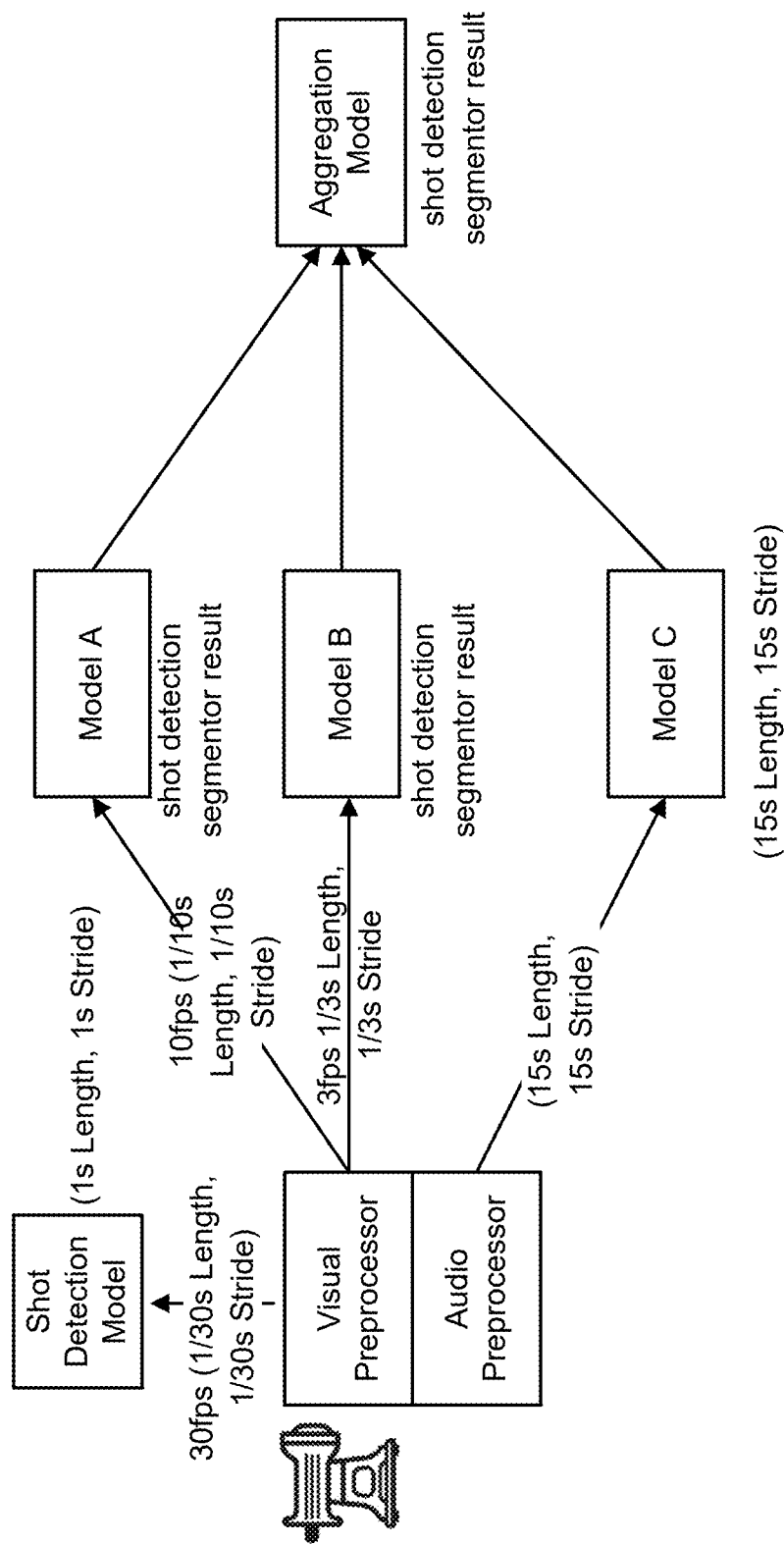
FIG. 5 illustrates a high-level overview of the second example data pipeline, in accordance with an embodiment.

FIG. 5 illustrates a high-level overview of the second example data pipeline, in accordance with an embodiment. In the second data pipeline, there are four types of preprocessing streams, three streams from the visual preprocessor and one stream from the audio preprocessor. The first stream is provided to the shot detection model with 30 fps, 1 s length and 1 s stride (i.e., 30 frames per second), the second stream is provided to Model A with 10 fps for a segment interval, and the third stream is provided to Model B with 3 fps for a segment interval.

The fourth stream is provided to Model C with audio signals for every 15 s segment. The goal of the second data pipeline is to identify a plurality of video segments, obtain data for the plurality of segments, and map each video segment to a respective vector. Moreover, the obtained vectors are registered and stored in the database 350 with the database register.

The shot detection model is coupled to receive frames per 1 s at 30 fps and output a plurality of time intervals that correspond to a plurality of video segments. Model A is coupled to receive a video segment of frames at 10 fps and output one or more visual embeddings for the video segment. Model B is coupled to receive a video segment of frames at 3 fps and output another one or more visual embeddings for the video segment. Model C is couple to receive a segment of audio signals of 15 s length with 15 s strides, and output one or more audio embeddings for the segment. The aggregation model is coupled to receive the outputs from Models A, B, and C for a video segment, and output one or more vectors mapping the video segment to the latent space.

As an example, a one-minute video may be divided into a set of clips, in which the start of a clip is a respective key frame (e.g., I-frame of the video). An example set is fourteen clips (in the unit of seconds) is (00:00-00:03), (00:03-00:07), (00:07-00:13), (00:13-00:16), (00:16-00:21), (00:21-00:25), (00:25-00:28), (00:28-00:33), (00:33-00:37), (00:37-00:41), (00:41-00:45), (00:45-00:49), (00:49-00:52), (00:52-00:60). The parallel decoder 310 decodes the fourteen clips in parallel. The preprocessor component generates the three visual streams. Thus, there may be 14×3=42 streams across the clips. During this process, a significant number of frames may be decoded from their compressed form. Thus, in one embodiment, the parallel decoder 310 can appropriately balance between storing the data in disk (object lake 355) or/and system memory to address memory constraints and I/O costs. The preprocessing component also generates the audio stream by extracting the audio signals in 15 s increments, (00:00-00:15), (00:15-00:30), (00:30-00:45), (00:45-00:60).

In one embodiment, the parallel process planner 320 generates plans for the second data pipeline. In one instance, the parallel process planner 320 starts by generating static plans for the shot detection model and Model C (audio inputs). An example plan generated for the shot detection model is (00:00-00:01), (00:1-00:02), (00:02-00:03), (00:03-00:04), . . . , (00:55-00:56), (00:56-00:57), (00:57-00:58), (00:58-00:59), (00:59-00:60), including 60 plans. An example plan generated for Model C is audio signals for segments (00:00-00:15), (00:15-00:30), (00:30-00:45), (00:45-00:60), including 4 plans. The parallel process planner 320 determines plans that are ready for execution. For example, plan (0-1) is determined to be ready for execution by the shot detection model once clip (0-3) has been decoded.

The plans that are ready may be provided to thread workers 340, and the thread workers 340 may provide the plans to the inference controller 370 as execution requests. The inference controller 370 determines the scale of requests and the type of model for the request. The one or more inference servers may deploy, for example, instances of the shot detection model or Model C on cloud servers with accelerator devices (e.g., GPU's, TPU's). As more plans are received, the inference controller 370 may scale out more instances to complete the execution of the plans.

The parallel process planner 320 generates dynamic plans for Models A and B. As shot detection or scene detection is performed, the segmentor 330 identifies different video segments and their corresponding intervals. For example, the segmentor 330 may identify a plurality of segments in the 1-minute video of (00:00-00:13), (00:13-00:16), (00:16-00:28), (00:28-00:45), (00:45-00:50), (00:50-00:60), and provide plans to the segmentor 330.

The parallel process planner 320 generates one or more plans for Model A and Model B. As an example, a 1a-th plan is to obtain data for the first segment (00:00-00:13) at 10 fps for Model A ("plan 1a"), a 2a-th plan is to obtain data for the second segment (00:13-00:16) at 10 fps for Model A ("plan 2a"), and a 3a-th plan is to obtain data for the third segment (00:16-00:28) at 10 fps for Model A ("plan 3a"), and so on, until a 6a-th plan is generated to obtain data for the sixth segment (00:50-00:60) at 10 fps for Model A ("plan 6a").

Similarly, a 1b-th plan is to obtain data for the first segment (00:00-00:13) at 30 fps for Model B ("plan 1b"), a 2b-th plan is to obtain data for the second segment (00:13-00:16) at 30 fps for Model B ("plan 2b"), and a 3b-th plan is to obtain data for the third segment (00:16-00:28) at 30 fps for Model B ("plan 3b"), and so on, until a 6b-th plan is generated to obtain data for the sixth segment (50-60) at 30 fps for Model B ("plan 6b").

Afterwards, plans for the aggregation model are also generated. As an example, a first plan is to obtain outputs from Models A and B for the first segment (00:00-00:13) for the aggregation model ("plan 1aggr"), a second plan is to obtain outputs from Model A and Model B for the second segment (00:13-00:16) for the aggregation model ("plan 2aggr"), a third plan is to obtain outputs from Models A and B for the third segment (00:16-00:28) for the aggregation model, and so on, until a sixth plan is to obtain data for the sixth segment (00:50-00:60) for the aggregation model.

The parallel process planner 320 (e.g., a component within the parallel process planner 320) determines whether plans are ready for execution. For example, a plan is ready for execution if the required inputs for the plan are decoded by the parallel decoder 310 or are output by a model. For example, plans 1a and 1b may be executed if the respective clips (00:00-00:03), (00:03-00:07), (00:07-00:13) are decoded. As another example, after plans 1a and 1b are completed, plan 1aggr can be executed since outputs from Models A and B for the first segment can be obtained. As yet another example, plans 6a and 6b can be executed after decoding of clips (00:49-00:52), (00:52-00:60) are completed. After, plan 6aggr can be executed based on the retrieved outputs.

The plans that are ready are provided by the parallel process planner 320 to the thread workers 340, and the thread workers 340 may perform preprocessing steps before sending requests to execute the appropriate models to the inference controller 370. For example, a thread worker 340 may receive plan 1a and perform any sampling or normalizing methods for inputting the data to Model A. As described above, the inference controller 370 may scale instances of Models A and B and the aggregation model as required. After the plans are executed, data that is no longer required in the object lake 355 are freed.

Figure 6:
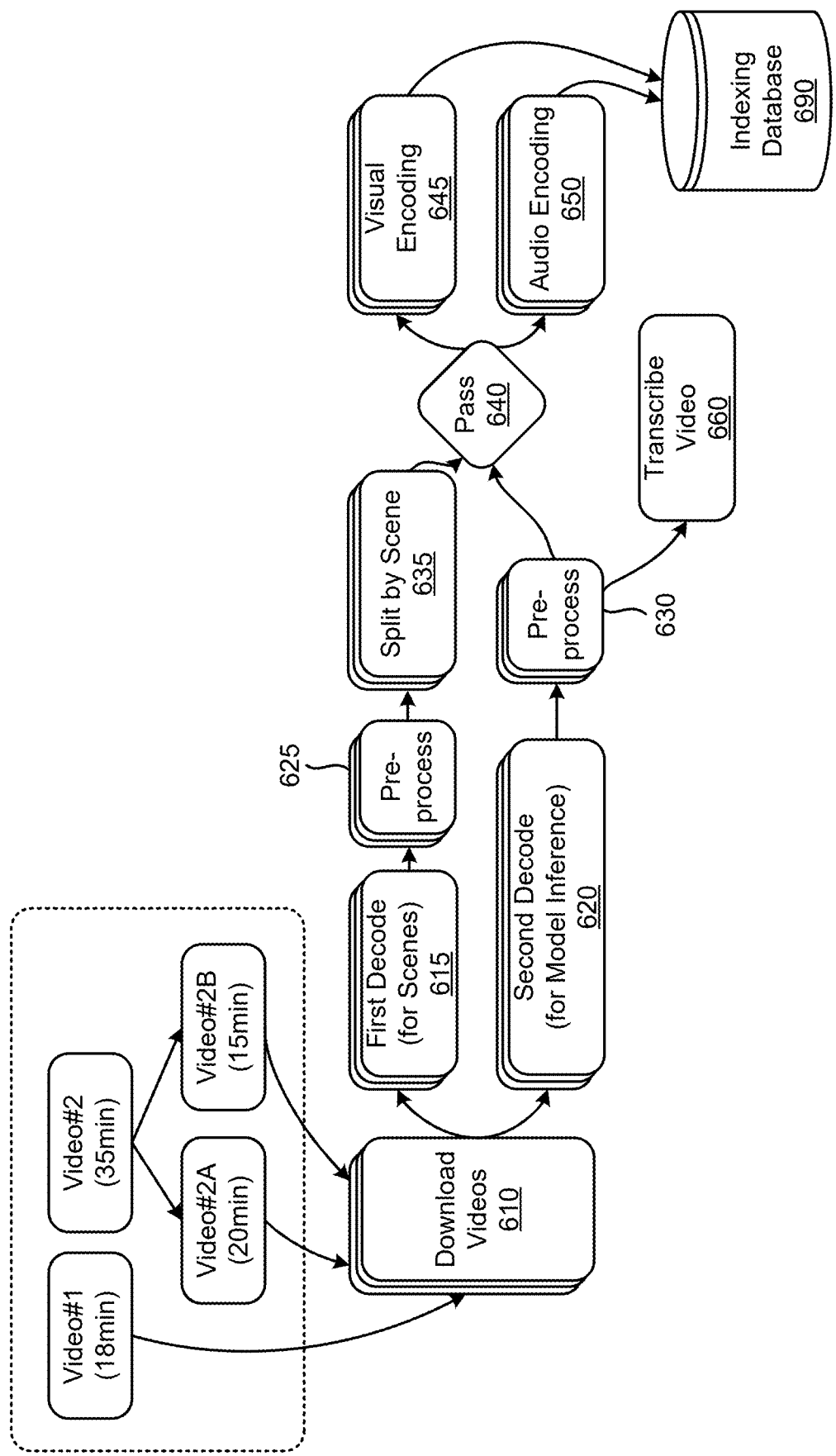
FIG. 6 is an indexing process for parallel video decoding, in accordance with another embodiment.

FIG. 6 is an indexing process for parallel video decoding, in accordance with another embodiment. In the indexing process of FIG. 6, the video analysis system 130 performs indexing of one or more videos in parallel by using pipelines executed by "task processors." In one embodiment, as described in further detail below, a task processor includes compute resources configured on a cloud infrastructure or on-premise compute resources. The compute resources for the task processors may be configured and/or managed by the video analysis system 130.

The video analysis system 130 receives requests to index one or more videos. In one instance, the requests may be from users of client devices 116A, 116B with requests to index the videos, such that the indexed information can be used to perform downstream applications, such as search query-based retrieval, and the like. In one instance, the requests may be received through an interface such as an application programming interface (API) or through a user interface (UI) configured by the video analysis system 130. In the example of FIG. 6, a request includes two videos, Video #1 and Video #2, from a user of the client device 116.

The video analysis system 130 obtains locations for downloading the one or more videos of the request from, for example, the contents of the request. For example, a location of a respective video in the request may be indicated by a uniform resource identifier (URI) to one or more files in a cloud object storage system, a database system, or a data lakehouse. As yet another example, a location of a respective video may be a uniform resource locator (URL) for streaming the video. In one embodiment, the videos of the request may be encoded using a video encoder, such that the resulting video file is in a compressed form. The file formats of the videos may be one or a combination of MP4, MKV, MOV, FLV, WebM, AVI, and the like. As yet another example, the user may upload one or more video files through the interface.

In one embodiment, the video analysis system 130 identifies a set of logical segments for the one or more videos. Specifically, each logical segment corresponds to a respective portion in the one or more encoded videos. For example, a logical segment may correspond to a respective interval of a particular video, as indicated by a start time (04:45) and an end time (18:32) of the logical segment, as well as an identifier for the source video.

In one instance, the video analysis system 130 logically splits the videos into a set of logical segments each within a threshold length (e.g., 20 minutes). In one instance, the one or more videos are each associated with metadata that describe various types of data associated with the video, such as the length of the video, location the video was taken, file format of the video, and the like. For each video, the video analysis system 130 may read the metadata file (which may be a separate file from the video file itself) to determine a total length of the encoded video. Responsive to determining that a length of a video is above the threshold, the video analysis system 130 identifies one or more logical segments of the video, where each logical segment is below the threshold.

In the example shown in FIG. 6, the video analysis system 130 determines a threshold of 20 minutes for each logical segment. The video analysis system 130 determines that after reading the metadata for Video #2, the total length of the video is 35 minutes. Since the length is larger than the threshold of 20 minutes, the video analysis system determines two logical segments, a first logical segment Video #2A corresponding to timestamp (0:0) to (20:00) of the video, and a second logical segment Video #2B corresponding to timestamp (20:01) to (35:00) of the video. Each of these logical segments is below 20 minutes in length. As another example, since Video #1 is 18 minutes and under the 20-minute threshold, the video analysis system 130 identifies the entire length of Video #1 as a logical segment.

The video analysis system 130 downloads 610 the one or more videos of the request. When the videos of the request are stored as files in cloud object storage, the video analysis system 130 may download the files via the URI's specified in the request. To compress the amount of storage required for the videos, the videos may be encoded to a compressed form using, for example, a video encoder that is part of a video codec. When the videos are streamed from an online application, the video analysis system 130 may receive an encoded bitstream.

The video analysis system 130 performs a decoding process to decode the content of the videos, which may include the visual frames of the video (e.g., composed of RGB pixel values), the audio stream of the video, the text captions of the video, and the like. In particular, the video analysis system 130 generates units of "tasks," where each task corresponds to processing a respective logical segment in the one or more videos. As described in further detail, a task may be viewed as a pipeline of various operations that include decoding the video content corresponding to the logical segment, indexing various segments that refer to scenes or shots within the logical segment in parallel, and storing the indexed information in a database.

In one embodiment, the execution of the pipeline for a task is performed by a task processor. As defined herein, a task processor refers to a compute resource equipped with hardware and/or software for executing the operations of the task, and may be configured on cloud infrastructure, on-premise servers of an enterprise, or any appropriate server with computing capability. To perform multiple tasks to process multiple logical segments in parallel, the video analysis system 130 may spin up multiple instances of the task processor by at least the number of logical segments identified for a request. As described below, multiple task processor instances may perform indexing on multiple logical segments identified from source videos of a request by executing the pipeline illustrated in FIG. 6 in parallel, such that at least executing a portion of the indexing pipeline for one logical segment overlaps with executing a portion of the indexing pipeline for another logical segment.

As illustrated in FIG. 6, for a given logical segment, the video analysis system 130 performs a decoding process to decode content of the logical segment in the source video. In one embodiment, the video analysis system 130 performs two different types of decoding processes. The decoding may be performed by the decoder of a codec. In one instance, the decoding is executed by a central processing unit (CPU) of a respective task processor instance. In another instance, the decoding is executed by a graphics processing unit (GPU) or a tensor processing unit (TPU) of the task processor instance. The video analysis system 130 performs 615 a first decoding process to decode and generate first decoded content for the time interval of the logical segment. In one embodiment, the first decoded content is of a first resolution and a first sampling rate. For example, for logical segment Video #2A, the first decoding process may generate content at (00:00)-(20:00) of Video #2, at a resolution of 480p and a sample rate of 1 frame per second (FPS).

The video analysis system 130 performs 620 a second decoding process to decode and generate second decoded content for the time interval of the logical segment. In one embodiment, the second decoded content is of a second resolution higher than the first resolution, and of a second sampling rate lower than the first sampling rate of the first decoding process. For example, for logical segment Video #2A, the second decoding process generates content at (00:00)-(20:00) of Video #2, at a resolution of 1080p and a sampling rate of 10 FPS.

In one embodiment, the video analysis system 130 downloads and decodes two or more logical segments of a same source video using, for example, multiple task processor instances. For example, Video #2 in the example of FIG. 6 is logically split into a first logical segment Video #2A that is indexed by a first task processor instance and a second logical segment Video #2B that is indexed by a second task processor instance. In such an embodiment, the video analysis system 130 configures a task processor instance responsible for indexing a logical segment to download and decode only a portion of the source video that corresponds to the time interval of the logical segment, without downloading and decoding the remaining portions of the source video. In this manner, after a first logical segment has been downloaded and decoded by a first task processor instance, a second task processor instance responsible for decoding a second logical segment of the source video does not have to re-decode or re-download the first logical segment of the video, saving further computational resources.

The video analysis system 130 may optionally pre-process 625 the decoded content from the first decoding process. The video analysis system 130 identifies a set of intervals for a set of segments, in which a segment may correspond to a continuous interval (e.g., on average 7-8 seconds) in the video that represents an action or event. In one embodiment, the video analysis system 130 applies a machine-learning scene detection model or shot detection model to identify a set of scenes. The scene detection model may identify timestamps or frame offsets in the video where a scene transition occurs from a scene to a next scene in the video.

In one embodiment, the scene detection model is coupled to receive a portion of frames, audio, text from the first decoded content, and make a determination whether that portion is a scene transition occurs in the video. Therefore, the video analysis system 130 can obtain a list of frame offsets for where scene transition occurs during the logical segment of the source video. For example, the output from the scene detection model after applying the scene detection model to the first decoded content for Video #2A may be at 13 s, 16 s, 28 s, 45 s, 50 s, and 60 s, and so on for a total of 22 scenes. Another logical segment may be analyzed to have 40 scenes. Since the first decoded content is of a lower resolution but with a high sampling rate, the scene detection model may be effectively applied to the frames of the first decoded content to detect scene transitions even though the quality of the resolution may be relatively coarse. For example, a difference in the pixel values for a frame marking the end of a first scene and a frame marking the beginning of a second scene may be above a threshold that indicates a content of the video transitioned from one shot to another shot, or one scene to another scene.

While identifying a set of segments that are scenes is used as a primary example in the specification, it is appreciated that in other embodiments, the set of segments can be identified in any appropriate manner using any appropriate tools to chunk or split the first decoded content into a set of segments. For example, FFmpeg chunking can chunk an MPEG video file into one or more segments, where each segment may have a predetermined interval. As another example, a trained machine-learning model may be coupled to receive information obtained from the first decoded content and identify a series of frame offsets based on a segmentation task that the model was trained to perform.

In one embodiment, after the set of scenes are identified from the first decoded content, the video analysis system 130 may free the first decoded content from memory, as the first decoded content may not be used for indexing afterwards.

Using the frame offsets or timestamps of the set of identified intervals, the video analysis system 130 splits 635 the second decoded content of the logical segment to generate a set of segments. As an example, each segment may correspond to a respective scene in the source video that are each identified using the outputs of the scene detection model. As an example, the set of segments for Video #2A may be segments of the second decoded content at (00:00-00:13), (00:13)-(00:16), (00:16)-(00:28), (00:28)-(00:45), (00:45)-(00:50), (00:50)-(00:60). Since the second decoded content is of a higher resolution, each of the split scene segments may be of a relatively high resolution that represents the semantic content fairly well. Therefore, the set of segments are used to generate embedding for indexing the video.

The video analysis system 130 passes 640 the set of segments for the logical segment of the source video to a set of one or more machine-learning encoder models. Specifically, a machine-learning encoder model may be configured as a neural network model, a transformer architecture, a convolutional neural network (CNN) architecture, and the like, and may be associated with one or more parameters (e.g., 1 billion, 10 billion, 100 billion, 1 trillion, 10 trillion parameters). For each identified segment, the video analysis system 130 applies parameters of the set of one or more machine-learning encoder models to information obtained from the segment to generate at least one embedding encoding the segment. The inputs may be obtained from the pixel values in frames of the segment, audio stream for the segment, and/or text associated with the segment (e.g., text from transcribed audio, captions in the visual frames). The at least one embedding may be a vector that represents the content of the segment in a latent space (e.g., 1024-dimension latent space). Therefore, a pair of segments that are semantically or otherwise similar to each other may be represented as a pair of embeddings that are relatively close in the latent space, while those that are not similar are represented as a pair of embeddings that are relatively farther away in the latent space.

In one embodiment, the set of machine-learning encoder models may include various types of encoder models that differ, for example, in the types of data modalities the encoder models are configured to process. An encoder model may be coupled to receive a stream of input data (e.g., a sequence of frames or an audio stream for a time interval of a segment) associated with a sampling rate. As another example, the encoder models may differ in the sampling rates of input data that the encoder models are configured to process.

In one embodiment, the set of machine-learning encoder models include at least a machine-learning visual encoder model and a machine-learning audio encoder model. The visual encoder model is coupled to received information obtained from the sequence of frames of a respective segment and generate at least one visual embedding in a latent space representing the visual content of the segment. The audio encoder model is coupled to receive information obtained from the audio stream of a respective segment and generate at least one audio embedding in a latent space representing the audio content of the segment.

The video analysis system 130 performs 645 a visual encoding process by applying the visual encoder model to the frames of a respective segment to generate a visual embedding. The video analysis system 130 performs 650 an audio encoding process by applying the audio encoder model to signals in an audio stream of a respective segment to generate an audio embedding. However, it is appreciated that the video analysis system 130 can configure any appropriate architecture of encoder models to generate embeddings for a segment. For example, the set of machine-learning encoder models may include similar example models, Model A, Model B, Model C as shown in FIG. 5.

The video analysis system 130 may generate embeddings in a similar way for the remaining segments in the set. In one embodiment, the execution of machine-learning encoder models may be performed on one or more GPU's, TPU's of the task processor instances. In one embodiment, the video analysis system 130 deploys multiple instances or multiple copies of the encoder models, such that the set of segments are processed in parallel. The video analysis system 130 stores the one or more embeddings for the set of segments in association with the source video. In one embodiment, the video analysis system 130 may also combine the embeddings for a segment together (e.g., assuming that the embeddings are in the same latent space or same dimensionality) to generate one or more combined embeddings for the segment. The combined embeddings for the set of segments are stored in the indexing database 690.

In one embodiment, the video analysis system 130 transcribes the audio stream for the logical segment of a task to convert the audio stream into text. The text for each segment may also be stored in the indexing database 690 in association with the source video.

In this way, the process described with respect to FIG. 6 introduces multiple cardinalities of parallelism, including the number of videos that can be included in an indexing request, splitting the videos into a number of logical segments, and the number of segments in each logical segment of a respective source video. In particular, since multiple tasks can be executed by task process instances in parallel, the indexing process for the videos in the request can be handled computationally efficiently, and can eliminate significant bottlenecks. In one embodiment, by performing the parallel decoding process to index videos, an approximately hour-long video may be indexed in less than three minutes, which is a technical improvement over existing indexing methods.

After the video analysis system 130 stores the embeddings for each segment of the one or more videos in the indexing database 690, the video analysis system 130 may retrieve the embeddings for one or more downstream applications. For example, the video analysis system 130 may receive a search query from a user of a client device 116 and a request to identify video segments related to the search query. The video analysis system 130 generates a query embedding encoding the search query in a latent space (e.g., same latent space as the embeddings for the video). The video analysis system 130 identifies one or more segments related to the search query by comparing the embeddings retrieved from the indexing database to the query embedding. Specifically, the identified segments may be those that are associated with embeddings within a threshold distance with the query embedding. The video analysis system 130 provides the one or more identified segments as a response to the request. For example, the identified segments may be displayed on a user interface rendered on the client device 116 of the user, such that the user can view the relevant segments and interact to view the relevant segments.

Returning to the system environment 100 of FIG. 1, the client devices 116A, 116B are computing devices that display information to users and communicates user actions to the video analysis system 130. While two client devices 116A, 116B are illustrated in FIG. 1, in practice many client devices 116 may communicate with the video analysis system 130 in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the video analysis system 130. For example, a client device 116 executes a browser application to enable interaction between the client device 116 and the video analysis system 130 via the network 120. In another embodiment, the client device 116 interacts with the video analysis system 130 through an application programming interface (API) running on a native operating system of the client device 116, such as IOS® or ANDROID™.

The client device 116 allows users to perform various actions on the video analysis system 130. In one embodiment, users of client devices 116 can submit queries to the video analysis system 130 to retrieve video segments or videos that are relevant to the user query. For example, the client device 116 may generate an interface for the user to submit the query, and responsive to receiving the query from the user, provide the query to the video analysis system 130. In addition, responsive to receiving a response from the video analysis system 130 including a set of video segments or videos including those segments that are determined to be relevant to the query, the interface may present this information to the user.

Video Analysis System

Figure 7:
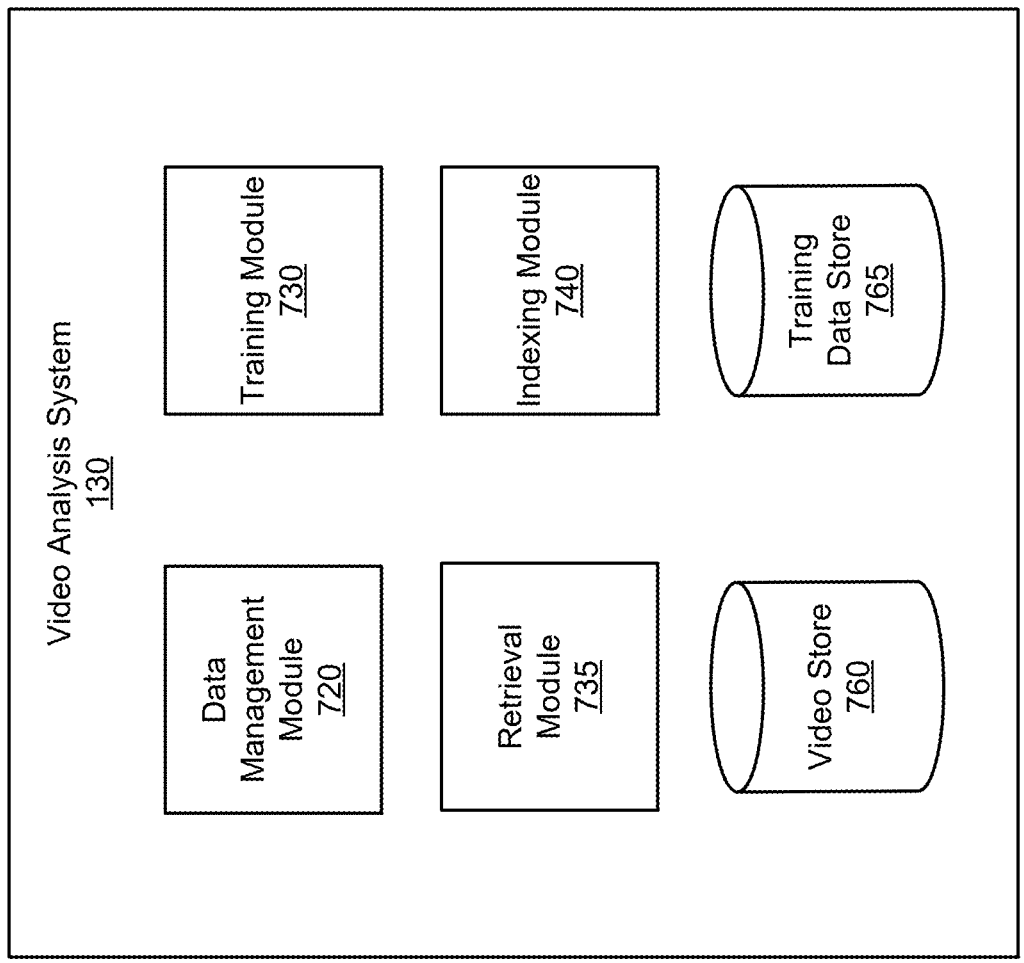
FIG. 7 is a block diagram of an architecture of a video analysis system, in accordance with an embodiment.

FIG. 7 is a block diagram of an architecture of a video analysis system 130, in accordance with an embodiment. In one embodiment, the video analysis system 130 may include components including a data management module 720, a training module 730, and a prediction module 735. The video analysis system 130 may also include a video store 760 and a training data store 765. In addition, the video analysis system 130 may also include any of the components in the architectures shown in FIGS. 2-6. However, it is appreciated that in other embodiments, the video analysis system 130 may include fewer or more components than that illustrated in FIGS. 2-6.

The video store 760 is a storage system that includes a collection of videos. Each video may include a sequence of frames or images and encoding or decoding information for the video. In one embodiment, the video store 760 may be a local storage, but in other embodiments, may be stored on servers on a datacenter or cloud object storage associated with a virtual datacenter. In one embodiment, the videos of the video store 760 are indexed, such that features like title, description, a thumbnail image, a link to play the video, and metadata are stored in association with the video. Moreover, the indexing may mark one or more segments of the video that are each a collection of frames dedicated to, for example, the same scene, subject matter, and the like. Moreover, the videos may be stored based on the source of the videos across one or more datasets. As an example, a first collection of videos obtained from a video platform may be organized as Dataset A, a second collection of videos obtained from a website may be organized as Dataset B, and so on.

The data management module 720 manages the training data store 765 for storing training datasets used to train the video retrieval model and/or the adaptive thresholding model described in conjunction with FIGS. 1 and 2. In one embodiment, with respect to the video retrieval model, the training dataset may include one or more training instances, where a training instance includes a respective query and a set of labels for a set of video segments in a dataset. A label for a video segment indicates whether the video segment is relevant to the query (e.g., encoded with value of "1") or not (e.g., encoded with value of "0"). For example, for a Dataset A in the video store 360, the one or more training instances may include $(T_{A1}, V_{A1,1}, R_{A1,1}), \ldots, (T_{A1}, V_{A1,M}, R_{A1,M}), \ldots, (T_{AN}, V_{AN,1}, R_{AN,1}), \ldots, (T_{AN}, V_{AN,M}, R_{AN,M})$, where $T_{Ak}$ denotes a query for a k-th training instance obtained from Dataset A, $V_{Ak,j}$ denotes a j-th video segment in the set for the k-th training instance, and $R_{Ak,j}$ denotes a label indicating whether the j-th video segment is relevant to the query for the k-th training instance.

Moreover, the data management module 720 may encode the query, the video segments, and the corresponding labels into a numerical form (e.g., numerical vector) that can be processed by the video retrieval model. For example, the query may be mapped to a numerical embedding that represents the query, whether it is in the form of image, text, video, into a vector in the latent space. As another example, a video segment may be mapped to a numerical embedding that represents the video segment in the latent space.

The training module 730 trains one or more machine-learned models for the video analysis system 130. In one embodiment, the training module 730 trains the video retrieval model using the training dataset generated by the data management module 720. In one instance, the training module 730 trains the parameters of the video retrieval model by iteratively repeating a forward pass step and a backpropagation step. During the forward pass step, the training module 730 applies the video retrieval model to the query and video segment pair $(T_{Ak}, V_{Ak,j})$ for multiple instances in the training dataset to generate estimated relevance scores. The training module 730 computes a loss function indicating a difference between the estimated relevance scores and the known labels RAKj for the training instances. The training module 330 performs the backpropagation step to update the parameters of the video retrieval model. This process is repeated until a convergence criterion is reached.

In one embodiment, responsive to receiving a request from the data management module 720, the training module 730 generates a set of relevance scores for a query and one or more video segments that can be used to generate the training dataset for training the adaptive thresholding model. For example, the training module 730 may generate a set of relevance scores by applying the trained video retrieval model to a query and one or more video segments that are known to be relevant to the query in a given dataset, as described in conjunction with the data management module 720. The training module 330 may provide the relevance scores to the data management module 720.

Returning to FIG. 7, the retrieval module 735 receives requests from client devices 116 including one or more queries. The query may specify to retrieve relevant videos in a dataset. The retrieval module 735 performs inference by applying the video retrieval model to video segments of the dataset and the query to generate relevance scores for the query. The retrieval module 735 also applies the adaptive thresholding model to the user query to generate one or more predicted filtering thresholds.

The retrieval module 735 may select and/or filter a set of video segments associated with relevance scores equal to or above the one or more predicted threshold values. In one instance, responsive to receiving the one or more predicted threshold values from the adaptive thresholding model, the retravel module 735 may calculate a range including the value (e.g., +/−5%, +/−10%, +/−20%) and select or filter the set of video segments that have relevance scores equal to or above the computed range as determined to be relevant to the query. The retrieval module 735 may provide the filtered set of video segments to the client device 116 of the request as a response.

The indexing module 740 performs an indexing process to index one or more videos. The indexing module 740 therefore may perform any of the functionalities described in conjunction with the processes of FIGS. 2-6 and may also include the indexing databases 250, 350, and/or 690. The indexing module 740 may continuously update the indexing process as requests to index new videos are received.

Method of Indexing Videos Using Parallel Decoding

Figure 8A:
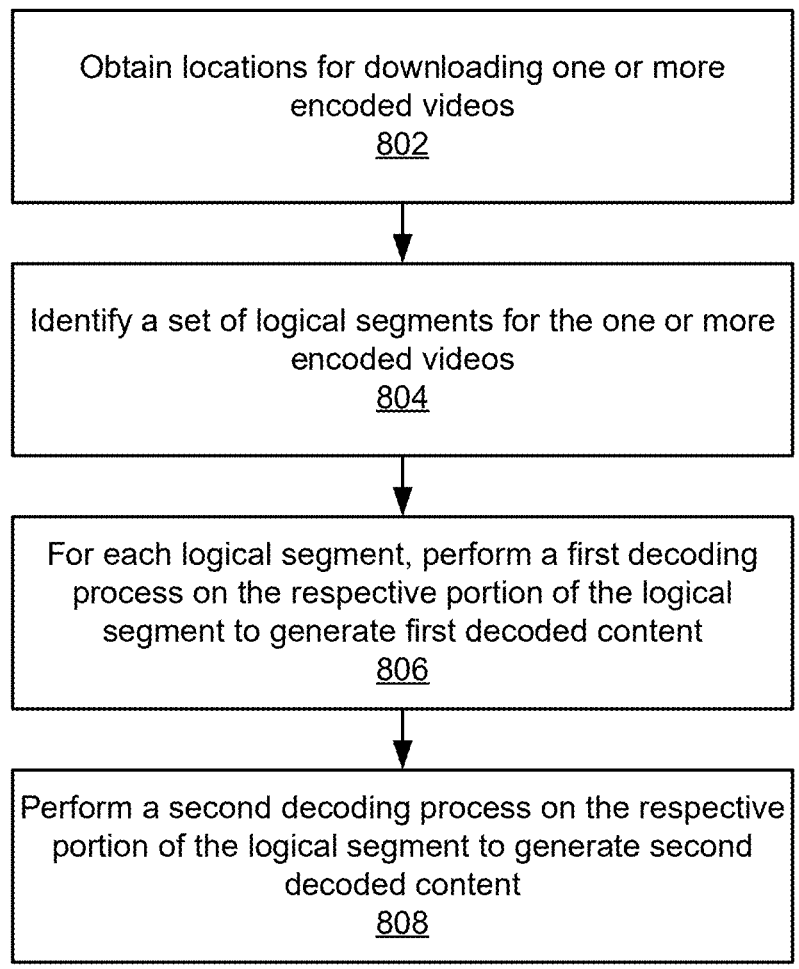
FIGS. 8A-8B illustrates a flowchart of a method of indexing one or more videos, in accordance with an embodiment.
Figure 8B:
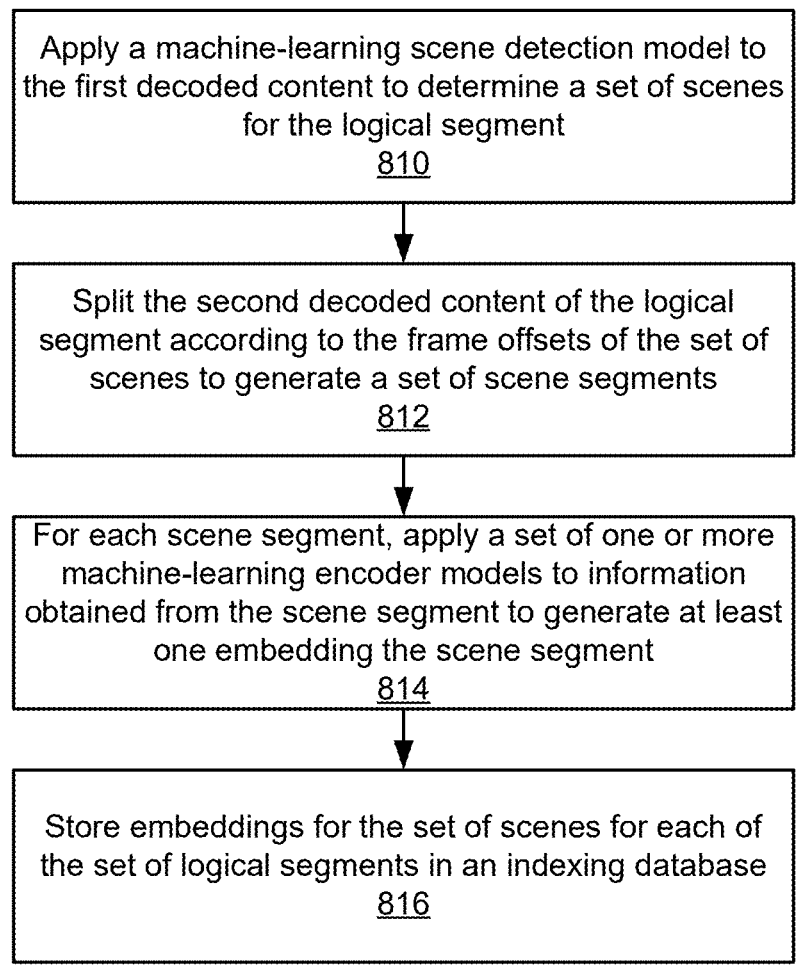

FIG. 8 illustrates a flowchart of a method of indexing one or more videos, in accordance with an embodiment. The video analysis system 130 obtains 802 locations for downloading one or more encoded videos. The video analysis system 130 identifies 804 a set of logical segments for the one or more encoded videos. In one embodiment, each logical segment corresponds to a respective portion in the one or more encoded videos. For each logical segment, the video analysis system 130 performs 806 a first decoding process on the respective portion of the logical segment to generate first decoded content. In one instance, the first decoded content is of a first resolution and a first sampling rate. The video analysis system 130 performs 808 a second decoding process on the respective portion of the logical segment to generate second decoded content. In one instance, the second decoded content is of a second resolution higher than the first resolution and a second sampling rate lower than the first sampling rate.

The video analysis system 130 applies 810 a machine-learning model to the first decoded content to determine a set of identified intervals for the logical segment. In one embodiment, each interval is identified with a respective frame offset. The video analysis system 130 splits 812 the second decoded content of the logical segment according to the frame offsets of the set of identified intervals to generate a set of -segments. In one embodiment, each -segment corresponds to a respective scene or a shot boundary in the source video. For each -segment, the video analysis system 130 applies 814 a set of one or more machine-learning encoder models to information obtained from the -segment to generate at least one embedding encoding the -segment. The video analysis system 130 stores embeddings for the set of segments for each of the set of logical segments in an indexing database.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
   obtaining locations for downloading one or more encoded videos;
   identifying a set of logical segments for the one or more encoded videos, wherein each logical segment corresponds to a respective portion in the one or more encoded videos;
   for each logical segment, performing an indexing process for the logical segment, comprising:
      performing a first decoding process on the respective portion of the logical segment to generate first decoded content, the first decoded content of a first resolution and a first sampling rate;
      performing a second decoding process on the respective portion of the logical segment to generate second decoded content, the second decoded content of a second resolution higher than the first resolution and a second sampling rate lower than the first sampling rate;
      applying a machine-learning model to the first decoded content to determine a set of intervals for the logical segment, wherein each interval is identified with a respective frame offset;
      splitting the second decoded content of the logical segment according to the frame offsets of the set of identified intervals to generate a set of segments, wherein each segment corresponds to a respective interval; and for each segment, applying a set of one or more machine-learning encoder models to information obtained from the segment to generate at least one embedding encoding the segment; and storing embeddings for the set of segments for each of the set of logical segments in an indexing database.

2. The computer-implemented method of claim 1, further comprising:

obtaining an audio stream of the second decoded content;

for each segment, transcribing at least a portion of the audio stream to text for the segment; and storing the text for the segment in the indexing database.

3. The computer-implemented method of claim 1, wherein the set of one or more machine-learning encoder models includes at least a visual encoder and an audio encoder, wherein for each segment, applying the set of one or more machine-learning encoder models further comprises:

generating at least one visual embedding for the segment by applying the visual encoder to information obtained from frames of the segment; and generating at least one audio embedding for the segment by applying the audio encoder to information obtained from an audio of the segment.

4. The computer-implemented method of claim 3, further comprising:

combining the at least one visual embedding and the at least one audio embedding for the segment to generate a combined embedding as the at least one embedding for the segment.

5. The computer-implemented method of claim 1, wherein identifying the set of logical segments for the one or more encoded videos further comprises:

reading metadata associated with each encoded video to determine that a length of the encoded video is above a threshold; and responsive to the determination, identifying one or more logical segments of the encoded video such that a length of each logical segment is below the threshold.

6. The computer-implemented method of claim 1, further comprising:

receiving a search query and a request to identify video segments related to the search query;

generating a query embedding encoding the search query;

identifying one or more segments related to the search query by comparing the embeddings retrieved from the indexing database to the query embedding; and providing the one or more identified segments as a response to the request.

7. The computer-implemented method of claim 1, wherein the set of logical segments includes a first logical segment and a second logical segment from a particular encoded video, and wherein after the first logical segment has been decoded, the first decoding process and the second decoding process for the second logical segment do not re-decode the first logical segment.

8. A non-transitory computer readable storage medium comprising instructions, the instructions when executed cause one or more processing systems to:

obtain locations for downloading one or more encoded videos;

identify a set of logical segments for the one or more encoded videos, wherein each logical segment corresponds to a respective portion in the one or more encoded videos;

for each logical segment, perform an indexing process for the logical segment, the instructions further causing the one or more processing systems to:

perform a first decoding process on the respective portion of the logical segment to generate first decoded content, the first decoded content of a first resolution and a first sampling rate, and perform a second decoding process on the respective portion of the logical segment to generate second decoded content, the second decoded content of a second resolution higher than the first resolution and a second sampling rate lower than the first sampling rate;

apply a machine-learning model to the first decoded content to determine a set of intervals for the logical segment, wherein each interval is identified with a respective frame offset;

split the second decoded content of the logical segment according to the frame offsets of the set of intervals to generate a set of segments, wherein each segment corresponds to a respective interval;

for each segment, apply a set of one or more machine-learning encoder models to information obtained from the segment to generate at least one embedding encoding the segment; and store embeddings for the set of segments for each of the set of logical segments in an indexing database.

9. The non-transitory computer readable storage medium of claim 8, the instructions when executed further causing the one or more processing systems to:

obtain an audio stream of the second decoded content;

for each segment, transcribe at least a portion of the audio stream to text for the segment; and store the text for the segment in the indexing database.

10. The non-transitory computer readable storage medium of claim 8, wherein the set of one or more machine-learning encoder models includes at least a visual encoder and an audio encoder, wherein for each segment, the instructions further cause the one or more processing systems to:

generate at least one visual embedding for the segment by applying the visual encoder to information obtained from frames of the segment; and generate at least one audio embedding for the segment by applying the audio encoder to information obtained from an audio of the segment.

11. The non-transitory computer readable storage medium of claim 10, the instructions when executed further causing the one or more processing systems to:

combine the at least one visual embedding and the at least one audio embedding for the segment to generate a combined embedding as the at least one embedding for the segment.

12. The non-transitory computer readable storage medium of claim 8, the instructions when executed further causing the one or more processing systems to:

read metadata associated with each encoded video to determine that a length of the encoded video is above a threshold; and responsive to the determination, identify one or more logical segments of the encoded video such that a length of each logical segment is below the threshold.

13. The non-transitory computer readable storage medium of claim 8, the instructions when executed further causing the one or more processing systems to:

receive a search query and a request to identify video segments related to the search query;

generate a query embedding encoding the search query;

identify one or more segments related to the search query by comparing the embeddings retrieved from the indexing database to the query embedding; and provide the one or more identified segments as a response to the request.

14. The non-transitory computer readable storage medium of claim 8, wherein the set of logical segments includes a first logical segment and a second logical segment from a particular encoded video, and wherein after the first logical segment has been decoded, the first decoding process and the second decoding process for the second logical segment do not re-decode the first logical segment.

15. A computer system, comprising:

one or more processing systems; and a non-transitory computer readable storage medium comprising stored instructions, the instructions when executed cause the one or more processing systems to:

obtain locations for downloading one or more encoded videos;

identify a set of logical segments for the one or more encoded videos, wherein each logical segment corresponds to a respective portion in the one or more encoded videos;

for each logical segment, perform an indexing process for the logical segment, the instructions further causing the one or more processing systems to:

perform a first decoding process on the respective portion of the logical segment to generate first decoded content, the first decoded content of a first resolution and a first sampling rate, and perform a second decoding process on the respective portion of the logical segment to generate second decoded content, the second decoded content of a second resolution higher than the first resolution and a second sampling rate lower than the first sampling rate;

apply a machine-learning model to the first decoded content to determine a set of intervals for the logical segment, wherein each interval is identified with a respective frame offset;

split the second decoded content of the logical segment according to the frame offsets of the set of identified intervals to generate a set of segments, wherein each segment corresponds to a respective interval;

for each segment, apply a set of one or more machine-learning encoder models to information obtained from the segment to generate at least one embedding encoding the segment; and store embeddings for the set of segments for each of the set of logical segments in an indexing database.

16. The computer system of claim 15, the instructions when executed further causing the one or more processing systems to:

obtain an audio stream of the second decoded content;

for each segment, transcribe at least a portion of the audio stream to text for the segment; and store the text for the segment in the indexing database.

17. The computer system of claim 15, wherein the set of one or more machine-learning encoder models includes at least a visual encoder and an audio encoder, wherein for each segment, the instructions further cause the one or more processing systems to:

generate at least one visual embedding for the segment by applying the visual encoder to information obtained from frames of the segment; and generate at least one audio embedding for the segment by applying the audio encoder to information obtained from an audio of the segment.

18. The computer system of claim 17, the instructions when executed further causing the one or more processing systems to:

combine the at least one visual embedding and the at least one audio embedding for the segment to generate a combined embedding as the at least one embedding for the segment.

19. The computer system of claim 15, the instructions when executed further causing the one or more processing systems to:

read metadata associated with the encoded video to determine that a length of the encoded video is above a threshold; and responsive to the determination, identify one or more logical segments of the encoded video such that a length of each logical segment is below the threshold.

20. The computer system of claim 15, the instructions when executed further causing the one or more processing systems to:

receive a search query and a request to identify video segments related to the search query;

generate a query embedding encoding the search query;

identify one or more segments related to the search query by comparing the embeddings retrieved from the indexing database to the query embedding; and provide the one or more identified segments as a response to the request.

* * * * *